United States Patent
Schmidegg et al.

(10) Patent No.: US 11,340,151 B2
(45) Date of Patent: May 24, 2022

(54) ROTATIONAL VISCOMETER FOR MEASURING THE VISCOSITY OF SUBSTANCES

(71) Applicant: ANTON PAAR GMBH, Graz-Strassgang (AT)

(72) Inventors: Harald Schmidegg, Raaba (AT); Peter Kraxner, Fernitz-Mellach (AT); Rupert Gruellenberger, Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 0 days.

(21) Appl. No.: 17/042,503

(22) PCT Filed: Feb. 11, 2019

(86) PCT No.: PCT/AT2019/060048
§ 371 (c)(1),
(2) Date: Sep. 28, 2020

(87) PCT Pub. No.: WO2019/183651
PCT Pub. Date: Oct. 3, 2019

(65) Prior Publication Data
US 2021/0025800 A1    Jan. 28, 2021

(30) Foreign Application Priority Data
Mar. 26, 2018 (AT) .............................. A 50255/2018

(51) Int. Cl.
*G01N 11/14* (2006.01)
(52) U.S. Cl.
CPC .................................... *G01N 11/14* (2013.01)
(58) Field of Classification Search
CPC ........ G01N 11/14; G01N 11/10; G01N 11/16; G01N 11/162; G01N 2291/02818
See application file for complete search history.

(56) References Cited

U.S. PATENT DOCUMENTS 2,491,639 A * 12/1949 Welkerg ................. G01N 11/14
                                                                       73/54.32
2,679,750 A    6/1954 Brookfield
(Continued)

FOREIGN PATENT DOCUMENTS

DE    1673242 B1    2/1971
DE    2301083 A1    7/1973
(Continued)

OTHER PUBLICATIONS

ESPACENET Machine Translation of JP 2001353432 A Which Originally Published On Dec. 25, 2001. (Year: 2001).*

*Primary Examiner* — David A. Rogers
(74) *Attorney, Agent, or Firm* — Laurence A. Greenberg; Werner H. Stemer; Ralph E. Locher

(57) ABSTRACT

A rotational viscometer for measuring a viscosity of substances contains a measuring shaft and a hollow shaft which is driven by a drive. The measuring shaft is arranged within the hollow shaft. A measuring body is arranged at one end of the measuring shaft and can be supplied with a sample. A coupling element is provided for connecting the hollow shaft to the measuring shaft. An angle measuring unit is arranged relative to the measuring shaft such that an angular difference and/or a rotational phase difference between the hollow shaft and the measuring shaft can be measured. The hollow shaft and the measuring shaft end opposite the measuring body and protrude into a housing. The coupling element is arranged in the housing, and the housing and the coupling element are connected to the measuring shaft and to the hollow shaft such that the housing is removable from the rotational viscometer.

14 Claims, 3 Drawing Sheets

(56) References Cited

U.S. PATENT DOCUMENTS

| | | | | |
|---|---|---|---|---|
| 2,839,915 A * | 6/1958 | Rich | G01N 11/16 | 73/54.25 |
| 3,382,706 A * | 5/1968 | Fitzgerald | G01N 11/162 | 73/54.25 |
| 3,435,666 A * | 4/1969 | Fann | G01N 11/14 | 73/54.39 |
| 3,777,551 A * | 12/1973 | Weiss | G01N 11/14 | 73/54.28 |
| 4,077,251 A * | 3/1978 | Winter | G01N 11/14 | 73/54.35 |
| 4,299,118 A * | 11/1981 | Gau | G01N 11/14 | 73/54.35 |
| 4,347,734 A * | 9/1982 | Heinz | G01N 11/14 | 73/54.33 |
| 4,488,427 A * | 12/1984 | Matusik | G01N 11/162 | 73/54.23 |
| 4,524,611 A * | 6/1985 | Richon | G01N 11/14 | 73/54.35 |
| 4,648,263 A * | 3/1987 | Deysarkar | G01N 11/14 | 73/54.33 |
| 4,754,640 A * | 7/1988 | Fitzgerald | G01N 11/162 | 73/32 A |
| RE32,837 E * | 1/1989 | Corni | B23Q 3/15546 | 235/375 |
| 4,878,378 A | 11/1989 | Harada | | |
| 4,920,787 A * | 5/1990 | Dual | G01N 11/162 | 73/54.41 |
| 5,201,214 A | 4/1993 | Sekiguchi et al. | | |
| 5,287,732 A * | 2/1994 | Sekiguchi | G01N 11/162 | 73/54.33 |
| 5,531,102 A * | 7/1996 | Brookfield | G01N 11/14 | 73/54.23 |
| 5,777,212 A * | 7/1998 | Sekiguchi | G01N 11/162 | 73/54.33 |
| 5,777,215 A * | 7/1998 | Calatzis | G01N 33/4905 | 356/39 |
| 5,874,666 A * | 2/1999 | Bishop | G01N 11/14 | 73/54.35 |
| 5,964,526 A * | 10/1999 | Schramm | B29B 7/283 | 366/96 |
| 6,065,330 A * | 5/2000 | Freeman | G01N 11/14 | 73/54.28 |
| 6,499,336 B1 * | 12/2002 | Raffer | G01N 11/14 | 73/54.23 |
| 6,807,849 B1 * | 10/2004 | Reed | G01N 11/14 | 73/54.28 |
| 6,952,950 B2 * | 10/2005 | Doe | G01D 3/022 | 73/54.01 |
| 7,159,654 B2 * | 1/2007 | Ellison | E21B 47/017 | 166/250.01 |
| 7,275,419 B2 * | 10/2007 | Raffer | G01N 11/142 | 73/54.01 |
| 8,171,776 B2 * | 5/2012 | Andersson | G01N 11/14 | 73/54.28 |
| 8,266,949 B2 * | 9/2012 | Harris | G01N 11/10 | 73/54.32 |
| 8,347,693 B2 * | 1/2013 | Pindiprolu | G01N 11/14 | 73/54.32 |
| 8,763,776 B2 | 7/2014 | Lukay et al. | | |
| 8,904,852 B2 * | 12/2014 | Wollny | G01N 11/142 | 73/54.27 |
| 9,261,446 B2 * | 2/2016 | Raffer | G01N 11/14 | |
| 9,372,140 B2 * | 6/2016 | Sneujink | G01N 11/10 | |
| 9,574,983 B2 * | 2/2017 | Santner | G01N 11/14 | |
| 10,502,670 B2 * | 12/2019 | Goodbread | G01N 9/002 | |
| 10,557,782 B2 * | 2/2020 | Nowak | G01N 11/162 | |
| 10,801,938 B2 * | 10/2020 | Amamiya | G01N 11/14 | |
| 10,895,520 B2 * | 1/2021 | Ziegler | G01N 11/142 | |
| 10,976,230 B2 * | 4/2021 | Panitzki | G01N 11/14 | |
| 2004/0173009 A1 * | 9/2004 | Doe | G01N 11/14 | 73/54.02 |
| 2005/0280542 A1 * | 12/2005 | Shieh | G06K 19/07758 | 340/572.8 |
| 2006/0000262 A1 * | 1/2006 | Raffer | G01N 11/14 | 73/54.28 |
| 2011/0061451 A1 * | 3/2011 | Harris | G01N 11/10 | 73/54.42 |
| 2011/0100098 A1 * | 5/2011 | Lauger | G01N 11/142 | 73/54.28 |
| 2012/0210774 A1 * | 8/2012 | Raffer | G01N 11/14 | 73/54.28 |
| 2014/0053638 A1 * | 2/2014 | Sneujink | G01N 11/16 | 73/54.28 |
| 2014/0208834 A1 * | 7/2014 | Doe | G01N 11/14 | 73/54.28 |
| 2016/0356690 A1 | 12/2016 | Amamiya et al. | | |

FOREIGN PATENT DOCUMENTS

| | | | | |
|---|---|---|---|---|
| DE | 7918425 U1 | 11/1979 | | |
| EP | 3104159 A1 | 12/2016 | | |
| EP | 3064926 B1 * | 3/2018 | | G01N 11/14 |
| JP | H0743287 A | 2/1995 | | |
| JP | H0933421 A | 2/1997 | | |
| JP | 2001353432 A | 12/2001 | | |
| WO | 2010045544 A2 | 4/2010 | | |

* cited by examiner

ROTATIONAL VISCOMETER FOR MEASURING THE VISCOSITY OF SUBSTANCES

BACKGROUND OF THE INVENTION

Field of the Invention

The present invention concerns a rotational viscometer according to the preamble of the independent claim.

Such rotational viscometers are used to measure the viscosity of specimens with sufficient accuracy over wide measurement ranges, by rotation of the measurement parts in arbitrary measurement vessels standing below the viscometer and containing the specimen.

Such viscometers are described for example in ASTM D2983 for testing lubricants in the automotive industry, and because of the principle are known as relative viscometers from U.S. Pat. No. 2,679,750.

The structure of a viscometer generally comprises a motor with a precise, constant rotational speed input, wherein said motor drives a measurement shaft which is connected to the rotational speed input/motor axis via mechanical reset means, with sensors for measuring rotational angle, a measurement part at the lower end of the measurement shaft, and a frame carrying the motor, shaft and measurement part and in some cases means for height adjustment. The measurement part dips to a defined immersion level into the specimen which may be contained in any vessel. The viscosity of a specimen is then determined by rotation of a standardized measurement part in the specimen to be measured. Measurement parts are known for example from ASTM D5133-96 and ISO 2555.

The measurement part is generally attached in releasable and hence exchangeable fashion to the measurement shaft rotated by a motor, and is dipped into the specimen and set in rotation by the motor. Because of its viscosity, the specimen in the measurement vessel acts as a brake to counter the movement of the measurement body. The drive shaft attached to the measurement part may be equipped with a spring element which counters the rotation, wherein the torque countering the rotational movement leads to a torsion of the shaft or to a deflection of the spring element. Suitable sensors determine the resulting angle between the measurement shaft and the drive shaft, wherein this angle is a measure of the viscosity of the specimen.

In contrast to precision rheometers or absolute measurement viscometers with precisely defined test geometry, e.g. with a shear gap with defined gap geometry between two measurement parts and hence also with defined shear conditions, in rotational viscometers the measurement part and/or measurement body or measurement body dips into the liquid specimen, wherein the geometry of the vessel is irrelevant.

The disadvantage of the rotational viscometer known from the prior art is that this can only be used within a restricted usage range, so that only fluids within a narrow viscosity range can be measured with the same rotational viscometer.

SUMMARY OF THE INVENTION

The object of the invention is therefore to provide a rotational viscometer which has as wide as possible a usage range, is simple in structure and supplies precise measurement values.

This object is achieved by the characteristic features of the independent claim. Here it is provided that the ends of the hollow shaft and the measurement shaft opposite the measurement body protrude into a housing, and the coupling element is arranged in the housing, and the housing and the coupling element are connected to the measurement shaft, to the hollow shaft, and/or optionally to or in the viscometer housing, such that the housing together with the coupling element arranged in the housing can be removed from the rotational viscometer and/or the measurement shaft and/or the hollow shaft, in particular can be push-fitted thereon.

The removable design of the housing allows simple exchange of the coupling element. Thus for example, depending on the specimen to be measured, different coupling elements may be provided which are matched to the characteristics of the specimen, and hence a plurality of different specimens of widely varying viscosities can easily be measured without high conversion and calibration costs.

Particularly advantageous embodiments of the rotational viscometer are defined in more detail by the features of the dependent claims.

In a preferred refinement of the rotational viscometer according to the invention, the coupling element is formed as a spring, in particular a coil spring or cruciform spring, or as a torsion element, in particular a torsion wire; the spring is arranged between the measurement shaft and the housing, and the housing is coupled to the hollow shaft and rotates therewith; or the spring is arranged between the hollow shaft and the housing, and the housing is connected to the measurement shaft and rotates therewith; wherein in measurement operation, when the measurement body is loaded with a specimen, the spring is deflected because of the counter-torque generated by the resistance from the viscosity of the specimen relative to the measurement body, wherein the angular difference and/or the rotational phase difference between the hollow shaft and the measurement shaft can be measured by means of the angle measuring unit.

A simple and even better matching to the specimens is achieved if the angle measuring unit, in particular the angle measuring unit and the measurement electronics, are integrated in the housing and formed so as to be removable therewith from the rotational viscometer.

A simple exchange of the housing with integrated sensors becomes possible if the angle measuring unit comprises at least one inductive sensor and/or capacitive sensor and/or optical sensor and/or a Hall sensor, wherein the angular difference and/or the rotational phase difference between the hollow shaft and the measurement shaft can be measured contactlessly. This is improved firstly by a corresponding contactless and co-rotating angle measurement which is designed without sliding contacts.

Advantageously, it may be provided that the angle measuring unit comprises two sensors, wherein the rotational angle of the hollow shaft and the rotational angle of the measurement shaft can each be measured by one of the sensors, and the angular difference and/or the rotational phase difference between the hollow shaft and the measurement shaft can be determined by forming the difference between the two angles.

The friction may be reduced or avoided, and hence a measurement error source reduced, if the measurement shaft is mounted fully or partly by means of ball-bearings, jewel bearings, magnetic bearings or air bearings, in particular in the hollow shaft. By the use of maintenance-free, low-friction magnetic bearings, in comparison with ball-bearings and toe bearings which form the prior art, the measurement performance can be improved and the service life of the bearing extended.

Advantageously, the housing may comprise a memory and/or identification unit, wherein by means of the information contained on the memory and/or identification unit, the adjustment and calibration data of the angle measuring unit and/or of the coupling unit can be retrieved or read from the memory and/or identification unit. A memory module which is connected directly to the angle measuring sensor of the analysis unit allows simple storage of the setting, which can easily be retrieved after exchange of the housing and elements contained therein.

A preferred embodiment of the rotational viscometer provides that this has an automatic housing detection unit for detecting the housing, wherein when the housing is pushed onto the rotational viscometer, the respective housing and the coupling element arranged in the housing and/or the angle measuring unit can be detected, and wherein in particular the adjustment and calibration data can be automatically supplied from the memory and/or identification unit to the analysis electronics of the rotational viscometer. This automatic housing detection may be achieved for example by means of RFID, which selects the housing applied by the user and also the calibration and adjustment data required for measurement and displays these so that incorrect measurements are avoided.

Advantageously, it may be provided that the drive is configured as a hollow shaft motor and the hollow shaft is integrated in the hollow shaft motor, or the hollow shaft can be driven by the drive by means of gearwheels or by means of a belt drive. By forming the drive as a hollow shaft motor, the drive shaft and the motor shaft may be combined, wherein the hollow shaft is driven either by the motor directly or via gears and bearings, and thus a particularly compact design is achieved. For simple exchange of the spring unit, the drive shaft of the drive and the hollow shaft may be combined, whereby for example the hollow shaft is simultaneously the shaft of a stepper motor. In this way, the production tolerances and runout tolerances are mitigated. Also, no additional bearings are required since the motor shaft of a stepper motor is already correspondingly double-mounted on ball-bearings. In this way, production parts are reduced to a minimum for the same functionality, which inter alia has a hugely positive influence on the production costs of the sensor system.

Further advantages and embodiments of the invention arise from the description and the attached drawings.

The invention is depicted diagrammatically in the appended drawings with respect to particularly advantageous exemplary embodiments which should not be interpreted restrictively, and is described as an example.

DETAILED DESCRIPTION OF THE INVENTION

Figure 1:
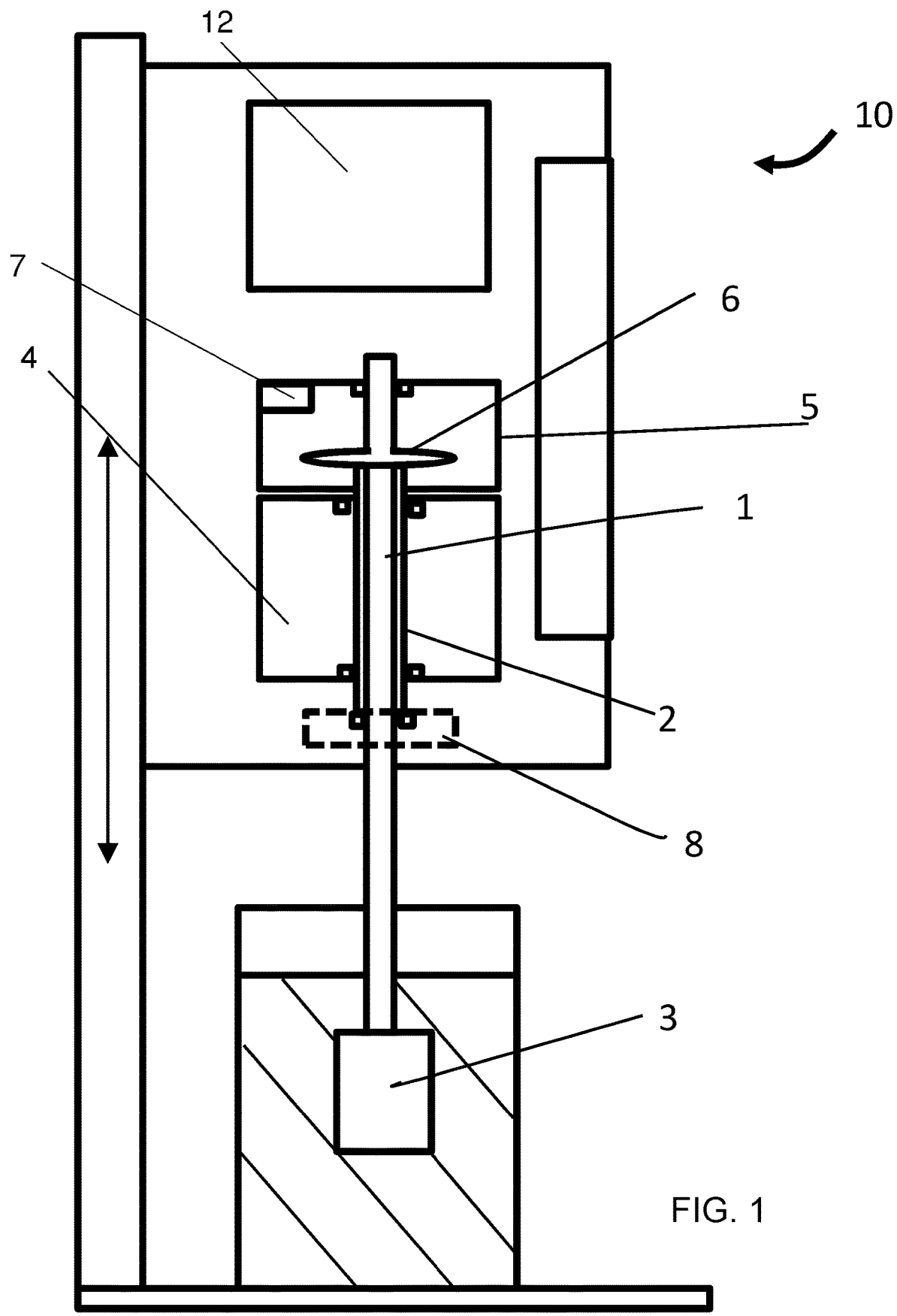
FIG. 1 shows a first embodiment of the rotational viscometer according to the invention.

FIG. 1 shows a first embodiment of the rotational viscometer 10 according to the invention. The rotational viscometer 10 comprises a measurement shaft 1 and a hollow shaft 2 driven by a drive 4. The hollow shaft 2 is formed hollow and the measurement shaft 1 is arranged coaxially therein. A measurement body 3 is arranged at the end of the measurement shaft 1. The ends of the measurement shaft 1 and hollow shaft 2—in this embodiment, the upper ends or the ends opposite the measurement body 3—protrude into the housing 5. The housing 5 is connected to the hollow shaft 2 and rotates therewith. A coupling element configured as a spring 6 is arranged in the housing 5. The spring 6 is arranged between the housing 5 and the measurement shaft 1, and attached thereto by one end. During measurement, the measurement body 3 is dipped into a measuring beaker containing a specimen, and the hollow shaft 2 is driven by the drive 4. Because the spring 6 is attached to the measurement shaft 1 and the housing 5, and because the housing 5 is attached to the hollow shaft 2, the spring 6 is stretched under the resistance of the measurement body 3 in the specimen and its counter-torque on the measurement shaft 1 when the hollow shaft 2 is driven by the drive 4.

A memory unit and/or identification unit 7 is preferably arranged in the housing 5, wherein information which is contained in the memory and/or identification unit 7, and relates to the coupling unit and spring characteristic curve and further adjustment and calibration data of the coupling unit 6, can be retrieved by the analysis unit 12 of the viscometer 10 or read from the memory and/or identification unit and be made available in the analysis unit 12 for determining the viscosity.

A fixing element 9, by means of which the spring 6 can be pushed onto the measurement shaft 1, is arranged on the spring 6. The housing 5 is also connected to the hollow shaft 2 via a releasable connecting element. Because of the releasable connection of the housing 5 to the hollow shaft 2, and of the spring to the measurement shaft 1, the housing 5 together with the spring 6 integrated in the housing 5 can easily be removed and exchanged. Thus for example, depending on the specimen to be measured, a specific housing 5 with the coupling element or spring 6 matched to the specimen may be used, whereby complex matching or adjustment is no longer required. Furthermore, specimens with a wide viscosity range can be measured with such a rotational viscometer 10 without having to exchange the entire rotational viscometer 10.

The rotational viscometer 10 furthermore comprises an angle measuring unit 8 which is arranged on the measurement shaft 1 and configured such that the angular difference and/or rotational phase difference between the hollow shaft 2 and measurement shaft 1 can be measured in measurement operation.

Optionally, the measurement shaft 1 may pass completely through the housing 5 as shown in FIG. 1, and/or the measurement shaft 1 may for example be mounted on or in the wall of the housing 5. Preferably, the measurement shaft is mounted above the spring element.

Figure 2:
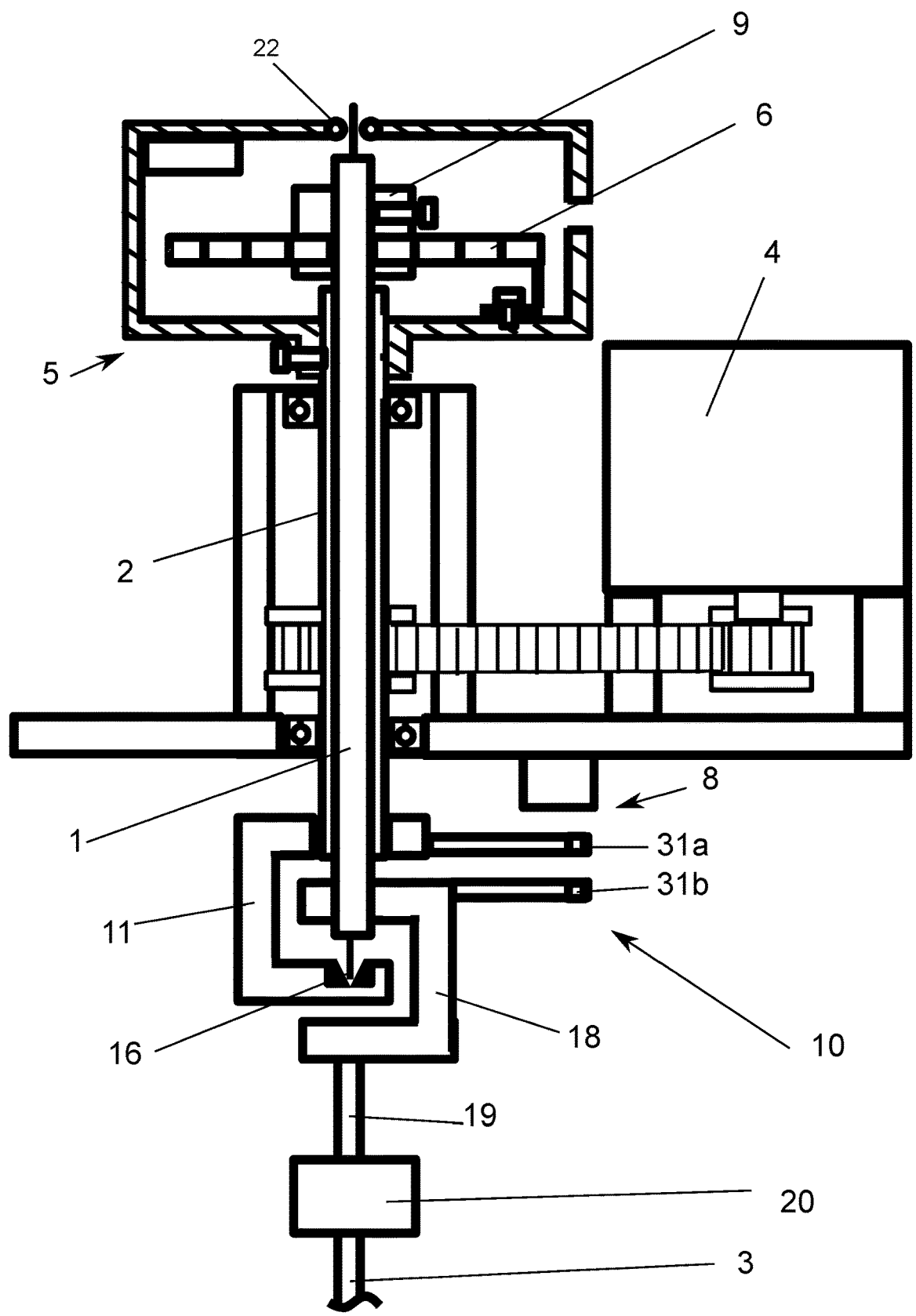
FIG. 2 shows a second embodiment of the rotational viscometer according to the invention.

FIG. 2 shows a preferred embodiment of the rotational viscometer 10 according to the invention in a sectional view.

A first pivot crank 11 is arranged close to a lower end of the hollow shaft 2, i.e. the end of the hollow shaft 2 facing the measurement body 3. The first pivot crank 11 is formed as a C-shaped element and its upper end side is arranged in the region of the lower end portion of the hollow shaft 2. A toe bearing 16 is arranged on the lower end of the first pivot crank 11, on the axis of the hollow shaft 2. In this embodiment, the toe bearing 16 is configured as a jewel bearing, wherein other bearings such as pivot bearings may alternatively be provided.

At its upper end, the measurement shaft 1 is mounted so as to be rotatable in the housing 5 via a bearing 22. In the region of the lower end portion of the measurement shaft 1, a second pivot crank 18 is provided. This second pivot crank 18 is formed as a C-shaped element and its upper end side is attached in the vicinity of the lower end portion of the measurement shaft 1. The lower end side of the second pivot crank 18 lies on the axis of the measurement shaft 1. A spindle holder 19 is arranged on a lower face of the lower end side of the second pivot crank 18. The measurement body 3 is releasably attached to the spindle holder 19 so as to be coaxial to the measurement shaft 1 and hollow shaft 2, via e.g. a mechanical or magnetic coupling 20.

Similarly to the embodiment in FIG. 1, a spring 6 is arranged in the housing 5 and pushed onto the measurement shaft 1 via the fixing element 9, and the housing 5 is also connected to the hollow shaft 2 via a releasable connecting element 13. The second end of the spring 6 is connected to the housing 5, and the connecting element 14 may be releasable.

Suitable fixing elements 9 or connecting elements for connecting the housing 5 to the hollow shaft 2, for connecting the measurement shaft 1 to the spring 6 or the housing 5, and/or for connecting the housing 5 to the coupling element, or conversely for connecting the housing 5 to the measurement shaft 1, and the hollow shaft 2 to the coupling element, are for example clamping or fixing screws, clamping or push-fit connections, profile shafts with corresponding hubs, and other connecting and fixing elements known from the prior art.

The angle measuring unit 8 is arranged in the region of the C-shaped first pivot crank 11 and second pivot crank 18 and configured for optical measurement, wherein it comprises two bars or encoder discs 31*a*, 31*b*. The first encoder disc 31*a* is attached to the first pivot crank 11, and the second encoder disc 31*b* is attached to the second pivot crank 18. The encoder discs 31*a*, 31*b* are two toothed discs which are set opposite each other and have a number of teeth on the periphery. The offset or width between the teeth is detected optically, and thus the angular difference and/or rotational phase difference between the hollow shaft 2 and measurement shaft 1 is determined contactlessly.

Figure 3:
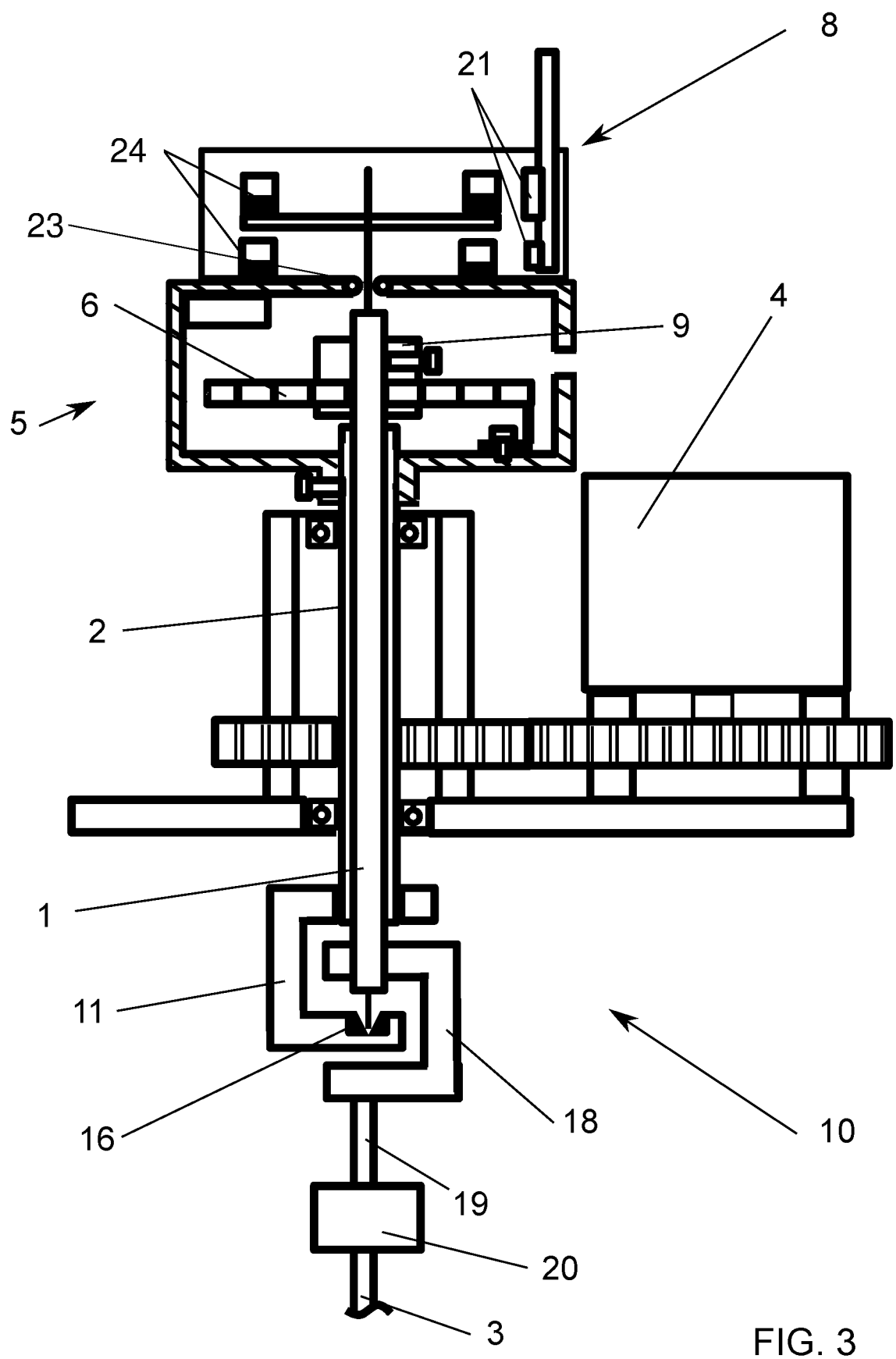
FIG. 3 shows a third embodiment of the rotational viscometer according to the invention with the angle measuring unit arranged on the housing.

FIG. 3 shows an alternative embodiment of the rotational viscometer 10 according to the invention in cross-section. The rotational viscometer 10 is configured similarly to that in FIG. 2 and also has two C-shaped pivot cranks which are connected together via a lever bearing.

In contrast to FIG. 2, the angle measuring unit 8 is arranged on the upper end of the housing 5 and designed to be removable therewith. Thus the angle measuring unit 8 matched to the coupling element or spring 6 can be exchanged together with the housing, and thus attached to the rotational viscometer 10 according to the specimen to be measured. The angle measuring unit 8 has a magnetic angle measurement, wherein several magnets 24 or magnetic discs are arranged on the end of the measurement shaft 1 passing through the housing 5, and on the housing 5 in the region of the bearing 23, and are detected by a respective differential angle sensor 21; thus the angular difference and/or rotational phase difference between the hollow shaft 2 and the measurement shaft 1 is determined contactlessly.

In measurement operation, when the measurement body 3 is loaded with a specimen, the spring 6 is deflected because of the counter-torque generated by the resistance from the viscosity of the specimen relative to the measurement body 3, wherein the angular difference and/or rotational phase difference between the hollow shaft 2 and the measurement shaft 1 is measured by means of the angle measuring unit 8.

Optionally to the embodiments shown, it may be provided that the measurement electronics of the angle measuring unit 8 are also integrated in the housing 5 or accommodated therein or attached thereto, and configured so as to be removable therewith from the rotational viscometer 10. The measured angles or angular difference and/or rotational phase difference may be then transmitted via sliding contacts or contactless transmission variants.

The spring 6 of the rotational viscometer 10 according to the invention may for example be a coil or cruciform spring, or a torsion spring or other spring element.

Alternatively, the coupling element may also be configured as a torsion element. Thus for example the measurement shaft 1 may comprise a torsion wire at its end connected to the housing 5, which torsion wire is arranged in the axis of the measurement shaft 1 and undergoes an elastic torsion in measurement operation. This torsion or twist may be recorded by means of strain gauges or other measurement sensors and used for analysis.

As an alternative to the embodiments of FIGS. 1 to 3, the coupling element or spring 6 may be arranged between the hollow shaft 2 and housing 5, and the housing 5 may be connected to the measurement shaft 1 and rotate therewith.

According to the invention, the angle measuring unit 8 comprises at least one inductive sensor and/or capacitive sensor and/or optical sensor and/or a Hall sensor, wherein the angular difference and/or rotational phase difference between the hollow shaft 2 and the measurement shaft 1 can thereby be measured contactlessly.

Optionally, the measurement shaft 1 may be mounted fully or partly by means of magnetic bearings or air bearings or ball-bearings. Mounting by means of air or magnet bearings reduces friction and thereby increases the measurement accuracy. Furthermore, the measurement shaft 1 may also be mounted inside the hollow shaft 2, or the mounting of the measurement shaft 1 may be integrated in the mounting of the hollow shaft.

Optionally, the housing 5 may have a memory and/or identification unit which contains the elements, i.e. the spring 6, the angle measuring unit 8 and/or the measurement electronics, or in which the characteristics of the spring 6, the angle measuring unit 8, the sensors and measurement electronics can be stored. By means of the information contained in the memory and/or identification unit, the adjustment or calibration data stored on the rotational viscometer 10 can be retrieved, and read or retrieved after fitting of the respective housing. For this, the rotational viscometer 10 may optionally comprise an automatic housing detection unit which automatically detects the respective housing 5 and angle measuring unit 8 contained therein.

When the housing 5 is pushed onto the rotational viscometer 10, the coupling element arranged in the housing 5 and/or the angle measuring unit 8 is detected, and the adjustment and calibration data from the memory and/or identification unit is automatically supplied to the analysis electronics of the rotational viscometer 10.

For example, the calibration data of the spring 6 and where applicable the angle measuring unit 8 and the identification of the spring 6 and its measurement range, can be read on the memory and/or or the corresponding motor resistance of the components may be given. These data are then combined in the analysis unit with the data of the calibration data of the other elements in the rotational viscometer 10, and made available in the rotational viscometer 10 for analysis of the measured rotational angles in viscosity data. Furthermore, it is possible that the memory and/or identification unit comprises an RFID chip by which the data can be read contactlessly.

Alternatively, it may be provided that for example the sensors of the angle measuring unit 8 are attached to the rotational viscometer 10 and remain thereon, and only parts of the angle measuring unit 8—e.g. the encoder discs 31*a*, 31*b* or magnets 22 or some thereof—can be removed together with the housing.

Optionally, as shown in FIG. 1, the drive 4 may be configured as a hollow shaft motor and the hollow shaft 2 may be integrated in the hollow shaft motor. Alternatively, the drive 4 may also drive the hollow shaft 2 via a belt drive, as shown in FIGS. 2 and 3, or be connected to the hollow shaft 2 via other gear forms such as gearwheels, and drive this.

The invention claimed is:

1. A rotational viscometer for measuring a viscosity of substances, the rotational viscometer comprising:
   a measurement shaft having ends;
   a drive;
   a hollow shaft being driven by said drive and having ends, wherein said measurement shaft is disposed inside said hollow shaft;
   a measurement body disposed at one end of said measurement shaft and can be loaded with a specimen;
   a coupling element, wherein said hollow shaft is connected to said measurement shaft via said coupling element;
   an angle measuring unit configured and disposed relative to said measurement shaft such that an angular difference and/or a rotational phase difference between said hollow shaft and said measurement shaft can be measured during measurement operation; and
   a housing, said ends of said hollow shaft and said measurement shaft opposites said measurement body protrude into said housing, said coupling element is disposed in said housing, said housing and said coupling element are connected to said measurement shaft and to said hollow shaft such that said housing together with said coupling element disposed in said housing can be removed from the rotational viscometer and/or from said measurement shaft and/or said hollow shaft, wherein said housing having a memory and/or an identification unit, and by means of information contained in said memory and/or said identification unit, adjustment and calibration data of said angle measuring unit and/or of said coupling unit can be retrieved or read from said memory and/or said identification unit.

2. The rotational viscometer according to claim 1, wherein said angle measuring unit is integrated in said housing and formed so as to be removable therewith from the rotational viscometer.

3. The rotational viscometer according to claim 2, wherein said angle measuring unit and said measurement electronics are integrated in said housing and formed so as to be removable therewith from the rotational viscometer.

4. The rotational viscometer according to claim 1, wherein said angle measuring unit contains at least one of an inductive sensor, a capacitive sensor, an optical sensor or a Hall sensor, wherein the angular difference and/or the rotational phase difference between said hollow shaft and said measurement shaft can be measured contactlessly.

5. The rotational viscometer according to claim 1, wherein said angle measuring unit has two sensors, wherein the rotational angle of said hollow shaft and the rotational angle of said measurement shaft can each be measured by one of said sensors, and the angular difference and/or the rotational phase difference between said hollow shaft and said measurement shaft can be determined by forming a difference between the two rotational angles.

6. The rotational viscometer according to claim 1, further comprising ball-bearings, jewel bearings, magnetic bearings or air bearings for mounting fully or partly said measurement shaft.

7. The rotational viscometer according to claim 1, wherein the rotational viscometer has an automatic housing detection unit for detecting said housing, wherein when said housing is pushed onto the rotational viscometer, said housing and said coupling element disposed in said housing and/or said angle measuring unit can be detected.

8. The rotational viscometer according to claim 1, wherein said drive is configured as a hollow shaft motor and said hollow shaft is integrated in said hollow shaft motor, or said hollow shaft can be driven by said drive by means of gearwheels or by means of a belt drive.

9. The rotational viscometer according to claim 1,
   wherein said coupling element is an elastic coupling element;
   further comprising a viscometer housing; and
   wherein said housing and said coupling element are connected to said measurement shaft, to said hollow shaft and to or in said viscometer housing, such that said housing together with said coupling element disposed in said housing can be removed from the rotational viscometer and/or from said measurement shaft and/or said hollow shaft in a push-fitted manner.

10. The rotational viscometer according to claim 1, further comprising ball-bearings, jewel bearings, magnetic bearings or air bearings for mounting fully or partly said measurement shaft in said hollow shaft.

11. The rotational viscometer according to claim 1, wherein the rotational viscometer has an automatic housing detection unit for detecting said housing, wherein when said housing is pushed onto the rotational viscometer, said housing and said coupling element disposed in said housing and/or said angle measuring unit can be detected and an adjustment and calibration data can be automatically supplied from said memory and/or said identification unit to analysis electronics of the rotational viscometer.

12. A rotational viscometer for measuring a viscosity of substances, the rotational viscometer comprising:
   a measurement shaft having ends;
   a drive;
   a hollow shaft being driven by said drive and having ends, wherein said measurement shaft is disposed inside said hollow shaft;
   a measurement body disposed at one end of said measurement shaft and can be loaded with a specimen;
   a coupling element, wherein said hollow shaft is connected to said measurement shaft via said coupling element, said coupling element being a spring, said spring being:
      disposed between said measurement shaft and said housing, said housing being coupled to said hollow shaft and rotates therewith; or
      disposed between said hollow shaft and said housing, said housing being connected to said measurement shaft and rotates therewith;
   an angle measuring unit configured and disposed relative to said measurement shaft such that an angular difference and/or a rotational phase difference between said hollow shaft and said measurement shaft can be measured during measurement operation;

a housing, said ends of said hollow shaft and said measurement shaft opposite said measurement body protrude into said housing, said coupling element is disposed in said housing, said housing and said coupling element are connected to said measurement shaft and to said hollow shaft such that said housing together with said coupling element disposed in said housing can be removed from the rotational viscometer and/or from said measurement shaft and/or said hollow shaft; and in a measurement operation, when said measurement body being loaded with the specimen, said spring being deflected because of counter-torque generated by a resistance from a viscosity of the specimen relative to said measurement body, and wherein the angular difference and/or the rotational phase difference between said hollow shaft and said measurement shaft being measured by means of said angle measuring unit.

13. The rotational viscometer according to claim 12, wherein said housing has a memory and/or an identification unit, wherein by means of information contained in said memory and/or said identification unit, adjustment and calibration data of said angle measuring unit and/or of said coupling unit can be retrieved or read from said memory and/or said identification unit.

14. The rotational viscometer according to claim 12, wherein said spring is a coil spring, a cruciform spring, a torsion element or a torsion wire.

* * * * *